United States Patent
Brooks

(10) Patent No.: US 9,347,541 B2
(45) Date of Patent: May 24, 2016

(54) MODULAR POWER TRANSFER UNIT ASSEMBLY FOR A VEHICLE

(71) Applicant: GM GLOBAL TECHNOLOGY OPERATIONS LLC, Detroit, MI (US)

(72) Inventor: Craig R. Brooks, Harrison Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 82 days.

(21) Appl. No.: 13/905,689

(22) Filed: May 30, 2013

(65) Prior Publication Data

US 2014/0357445 A1   Dec. 4, 2014

(51) Int. Cl.
| | |
|---|---|
| *F16H 48/22* | (2006.01) |
| *F16H 48/08* | (2006.01) |
| *B60K 17/354* | (2006.01) |
| *F16H 48/10* | (2012.01) |
| *B60K 17/344* | (2006.01) |
| *B60K 23/00* | (2006.01) |
| *B60K 23/08* | (2006.01) |
| *F16H 1/14* | (2006.01) |

(52) U.S. Cl.
CPC ............ *F16H 48/22* (2013.01); *B60K 17/344* (2013.01); *B60K 17/354* (2013.01); *B60K 23/00* (2013.01); *B60K 23/08* (2013.01); *F16H 48/08* (2013.01); *F16H 48/10* (2013.01); *B60K 2023/0833* (2013.01); *F16H 1/14* (2013.01)

(58) Field of Classification Search
CPC ......... F16H 48/22; F16H 48/10; F16H 48/08; B60K 17/354
See application file for complete search history.

(56) References Cited

U.S. PATENT DOCUMENTS

| | | | |
|---|---|---|---|
| 4,457,394 A | 7/1984 | Suzuki | |
| 4,875,978 A * | 10/1989 | Hiketa | ........................ 180/248 |
| 5,105,900 A | 4/1992 | Adler et al. | |
| 5,105,902 A | 4/1992 | Wilson et al. | |

(Continued)

FOREIGN PATENT DOCUMENTS

| | | |
|---|---|---|
| CN | 1618644 A | 5/2005 |
| CN | 101994811 A | 3/2011 |

(Continued)

OTHER PUBLICATIONS

Office Action for Chinese Patent Application No. 201410239522.7 dated Mar. 2, 2016; 3 pages.

*Primary Examiner* — Derek D Knight
*Assistant Examiner* — Timothy M Hannon
(74) *Attorney, Agent, or Firm* — Cantor Colburn LLP

(57) ABSTRACT

A power transfer unit assembly for transferring torque from a differential carrier to a propeller shaft includes an input shaft configured to be rotatably driven by the transmission differential carrier about a first axis of rotation of the differential carrier. A first bevel gear is engaged with a second bevel gear. The first bevel gear is annular and concentrically surrounds the input shaft. The second bevel gear is configured to rotatably drive the propeller shaft about a second axis of rotation of the propeller shaft that is substantially perpendicular to the first axis of rotation. The power transfer unit assembly has a compound planetary gear set concentric with the first axis of rotation. The compound planetary gear set is configured to transfer torque from the input shaft to the first bevel gear at a reduction ratio. Modular power transfer unit assemblies having common components are disclosed.

12 Claims, 6 Drawing Sheets

(56) References Cited

U.S. PATENT DOCUMENTS

| | | |
|---|---|---|
| 5,411,110 A | 5/1995 | Wilson et al. |
| 6,095,939 A | 8/2000 | Burns et al. |
| 6,523,633 B1 | 2/2003 | Teraoka et al. |
| 6,945,374 B2 | 9/2005 | Puiu |
| 7,568,568 B2 | 8/2009 | Porter et al. |
| 8,474,349 B2 | 7/2013 | Grogg et al. |
| 8,596,436 B2 | 12/2013 | Grogg et al. |
| 2003/0057007 A1 | 3/2003 | Stevens |
| 2005/0202918 A1 | 9/2005 | Mizon et al. |
| 2005/0230213 A1 | 10/2005 | Puiu |
| 2006/0094556 A1 | 5/2006 | Mizon et al. |
| 2006/0199697 A1* | 9/2006 | Kirkwood et al. ............ 477/5 |
| 2008/0113843 A1* | 5/2008 | Kenmotsu et al. ......... 475/222 |
| 2008/0300101 A1* | 12/2008 | Jarzyna et al. ............. 477/35 |
| 2010/0120390 A1 | 5/2010 | Panikkath et al. |
| 2011/0127135 A1 | 6/2011 | Grogg et al. |
| 2011/0256976 A1 | 10/2011 | Burgbacher et al. |
| 2014/0174253 A1* | 6/2014 | Stephens et al. .......... 74/665 F |

FOREIGN PATENT DOCUMENTS

| | | |
|---|---|---|
| JP | S6353118 A | 3/1988 |
| KR | 20100102082 A | 9/2010 |

* cited by examiner

MODULAR POWER TRANSFER UNIT ASSEMBLY FOR A VEHICLE

TECHNICAL FIELD

The present teachings generally include a power transfer unit assembly for an all-wheel drive vehicle.

BACKGROUND

Power transfer units (PTUs) are used in some vehicles to distribute driving torque provided from an engine and transmission to the right front wheel and both rear wheels of a vehicle. In some other arrangements the right side half shaft passes through the PTU and is not considered part of the PTU. For example, some power transfer units only transfer torque from a transverse transmission differential to a propeller shaft, which then drives rear half shafts through a rear differential. A hypoid gear set is often used to accomplish the 90 degree turn in the direction of drive between the front differential carrier axis of rotation and the propeller shaft axis of rotation. The torque ratio that the hypoid gear set can provide is dependent on the relative tooth counts of the hypoid ring gear and the pinion gear. The diameters of these gears are limited by available packaging space.

SUMMARY

A power transfer unit assembly for transferring torque from a differential carrier of a front differential to a propeller shaft of a vehicle includes an input shaft configured to be rotatably driven by the differential carrier about a first axis of rotation of the differential carrier. The power transfer unit assembly also includes a first bevel gear that is engaged with a second bevel gear. As used herein, a "bevel gear" includes a spiral bevel gear, such as a hypoid ring gear or a hypoid pinion gear. The first bevel gear is annular and concentrically surrounds the input shaft. The second bevel gear is configured to rotatably drive the propeller shaft about a second axis of rotation of the propeller shaft that is substantially perpendicular to the first axis of rotation. The power transfer unit assembly has a compound planetary gear set concentric with the first axis of rotation. The compound planetary gear set is configured to transfer torque from the input shaft to the first bevel gear at a reduction ratio (i.e., torque of the first bevel gear is less than torque of the input shaft), and at increased speed.

In one aspect of the present teachings, the power transfer unit can include a disconnect clutch that is selectively disengageable to disconnect the reaction torque of the compound planetary gear set from a stationary member, thereby preventing torque transfer from the input shaft to the first bevel gear through the compound planetary gear set. Accordingly, when the disconnect clutch is disengaged, no torque would be provided to the propeller shaft, and the vehicle would function in a front wheel-drive mode.

The compound planetary gear set can include a first sun gear, a second sun gear, a carrier, and first and second sets of pinion gears. The first sun gear is operatively connectable to a stationary member, such as a cover for the power transfer unit assembly, to ground the first sun gear. The first sun gear can be continuously grounded, or selectively disengageable from the stationary member if a disconnect clutch is included. The second sun gear is fixed to an annular shaft portion of the first bevel gear to rotate in unison with the first bevel gear. As used herein, two components rotate "in unison" when they are fixed to one another to rotate together as a unit at the same speed. The carrier is fixed to the input shaft to rotate in unison therewith. The first set of pinion gears and the second set of pinion gears are both rotatably supported by the carrier. The first set of pinion gears meshes with the first sun gear, and the second set of pinion gears meshes with the first set of pinion gears and with the second sun gear.

The single axis layout of the compound planetary gear set (i.e., the concentricity of the compound planetary gear set with the first axis of rotation) saves packaging space in comparison to power transfer units that require multi-axis gearing arrangements between the input member and the hypoid ring gear to reduce the overall torque ratio of the power transfer unit assembly. Additionally, the single axis layout of the compound planetary gear set enables modularity, as common components can be used with different sets of additional componentry, such as the compound planetary gear set and/or the disconnect clutch to meet specific vehicle platform needs, all while maintaining a constant relative position of the first axis of rotation of the input shaft and first bevel gear to the second axis of rotation of the second bevel gear and a consistent direction of rotation and torque level of the propeller shaft. Different modular power transfer unit assemblies can thus be implemented across different vehicle lines that share a fixed orientation of the input axis of the power transfer unite relative to the axis of rotation of the propeller shaft. The torque reduction ratio of the compound planetary gear set can be configured specifically so that a common torque is provided at the propeller shaft whether the compound planetary gear set is included in the power transfer unit assembly or not, so that a higher torque at the input shaft, such as on a vehicle with a high performance engine, or a lower torque at the input shaft, such as on a vehicle with a lower performance engine, will result in a the same torque at the propeller shaft. The speed of the propeller shaft will be higher with a modular power transfer unit assembly having the compound planetary gear set. The torque-carrying capability of the hypoid ring gear and the pinion gear thus need not be increased for use with the high performance engine.

Because a second axis is not required for the torque reduction accomplished by the planetary gear set, an overall packaging diameter reduction is achieved by using the single axis power transfer unit assembly disclosed herein. Overall weight and number of components may also be reduced, as two-axis power transfer units require a second transfer shaft between the input shaft and the first bevel gear, which necessitates two additional sets of bearings. Moreover, two-axis power transfer units use helical gear sets that create high gear separation forces between the axes, requiring a more extensive and therefore heavier housing to provide reaction of the forces.

The above features and advantages and other features and advantages of the present teachings are readily apparent from the following detailed description of the best modes for carrying out the present teachings when taken in connection with the accompanying drawings.

DETAILED DESCRIPTION

Figure 1:
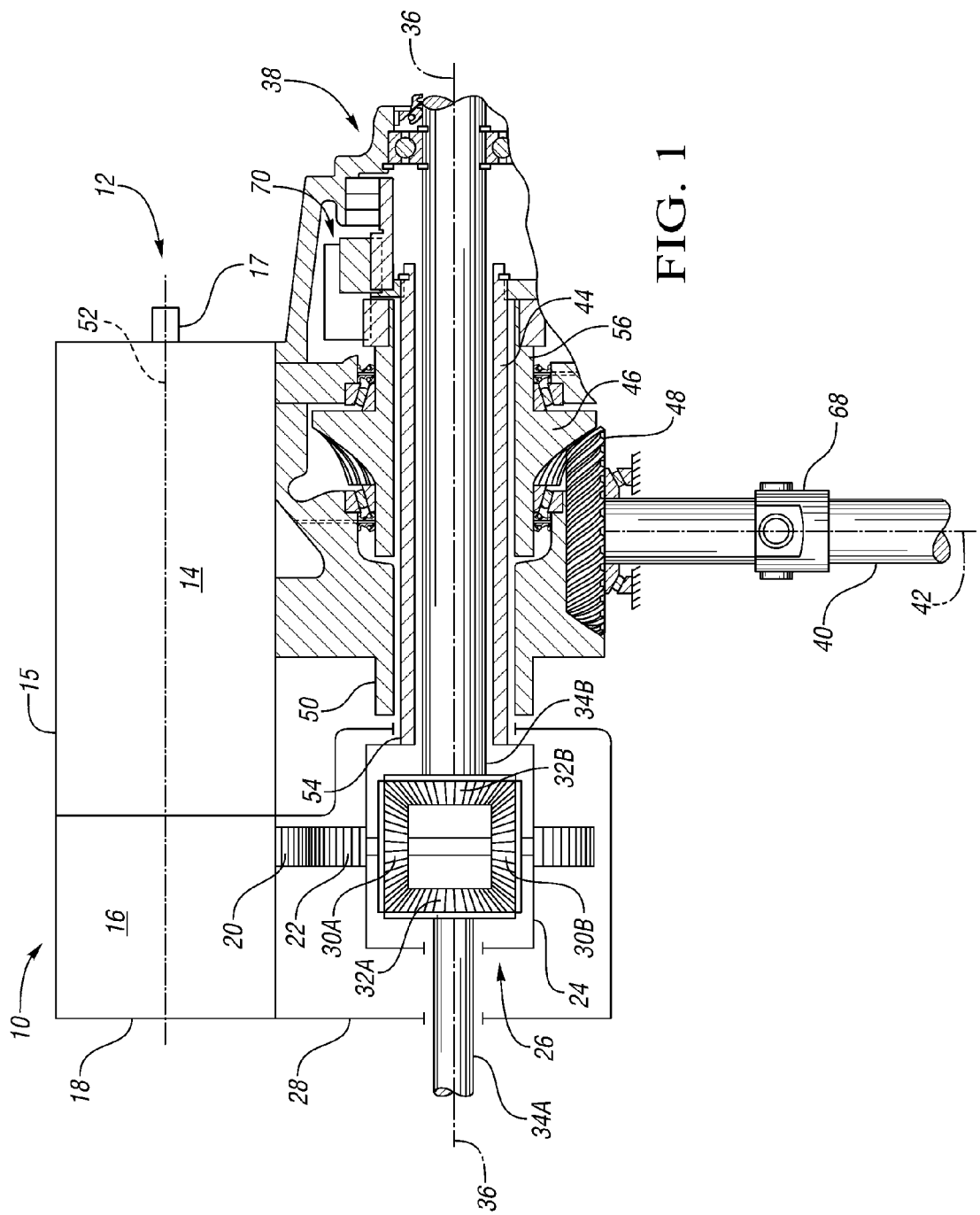
FIG. 1 is a schematic partially cross-sectional and fragmentary view of a vehicle having a powertrain with a first embodiment of a power transfer unit assembly surrounding a front half shaft.

Referring to the drawings, wherein like reference numbers refer to like components throughout the several views, FIG. 1 shows a portion of a vehicle 10 having a powertrain 12. The powertrain 12 includes an engine 14 that drives a multi-speed transmission 16. The engine 14 has an engine block 15. A crankshaft 17 extends from within the engine block 15 to connect with a transmission input member (not shown), as is understood by a person skilled in the art. The transmission 16 can include a gearing arrangement and a plurality of electively engageable clutches that provides torque at a transmission output member 20. Alternatively, a continuously variable transmission arrangement can be used instead of a gearing arrangement and clutches. The transmission 16 has a transmission housing 18.

The transmission output member 20 meshes with a helical gear 22 fixed to a carrier 24 of a front differential 26 to rotate in unison with the carrier 24, or can be connected to the carrier 24 via a chain drive. The front differential 26 is also referred to herein as a transmission differential 26. A differential housing 28 surrounds the front differential 26 and mounts to the transmission housing 18. The differential 26 includes interconnected pinion gears 30A, 30B that rotate in unison with the differential carrier 24. The pinion gears 30A, 30B mesh with side gears 32A, 32B. Side gear 32A is mounted to rotate with a first half shaft 34A that is connected to rotate with a left front wheel (not shown). Side gear 32B is mounted to rotate with a second half shaft 34B that is connected to rotate with a right front wheel (also not shown). The differential helical gear 22, differential carrier 24, side gears 32A, 32B, and half shafts 34A, 34B all rotate about a first axis of rotation 36. The transmission differential 26 is designed to allow side-to-side variation of wheel speeds, and the differential carrier 24 spins at the average of these speeds.

A first embodiment of a power transfer unit assembly 38 is configured to operatively connect the differential carrier 24 to a propeller shaft 40 that in turn connects to rear wheels through a rear differential (not shown). The propeller shaft 40 is arranged to rotate about a second axis of rotation 42 that is substantially perpendicular to the first axis of rotation 36, but is offset from and does not intersect the first axis of rotation 36. That is, in FIG. 1, the second axis of rotation 42 is above or below the plane of the cross-section that includes the first axis of rotation 36.

Accordingly, the power transfer unit assembly 38 enables driving torque ultimately provided by the engine 14 through the front differential 26 to front wheels to also be directed to rear wheels via the propeller shaft 40, such as in an all wheel-drive mode of operation.

As discussed further herein, the power transfer unit assembly 38 is one of four different power transfer unit assemblies 38, 138, 238, 338 shown in FIGS. 3-6 that share some common components, such as an input shaft 44, a bevel gear set with a first bevel gear 46 and a second bevel gear 48, and a stationary housing 50 surrounding and supporting the bevel gears 46, 48. The bevel gears 46, 48 may be hypoid spiral gears but are not limited to such. As used herein, the first bevel gear 46 is referred to as a hypoid ring gear 46 and the second bevel gear 48 is referred to as a pinion gear 48.

The four power transfer unit assemblies 38, 138, 238, 338 are thus modular, as they share a base of common components that can be supplemented with additional components (such as a disconnect clutch, a compound planetary gear set, or both) to achieve different architectures suitable for different vehicle platforms. Any one of the power transfer unit assemblies 38, 138, 238, 338 can be selected for use in a vehicle with the same differential 26 and propeller shaft 40, or with a different differential and propeller shaft, but still arranged along the same first axis of rotation 36 and second axis of rotation 42. The four power transfer unit assemblies 38, 138, 238, 338 are each arranged with torque transfer components concentric with and rotatable about a single axis (the first axis of rotation 36). Because the components are arranged about a single axis of rotation 36, the overall radial dimension of each of the power transfer unit assemblies 38, 138, 238, 338 is kept relatively small, enabling packaging into a fixed available packaging space adjacent the engine block 15. Specifically, the power transfer unit assemblies 38, 138, 238, 338 can be used across vehicle platforms that have various distances from an effective axis of rotation 52 of the crankshaft 17 to the first axis of rotation 36 of the hypoid ring gear 46.

Figure 2:
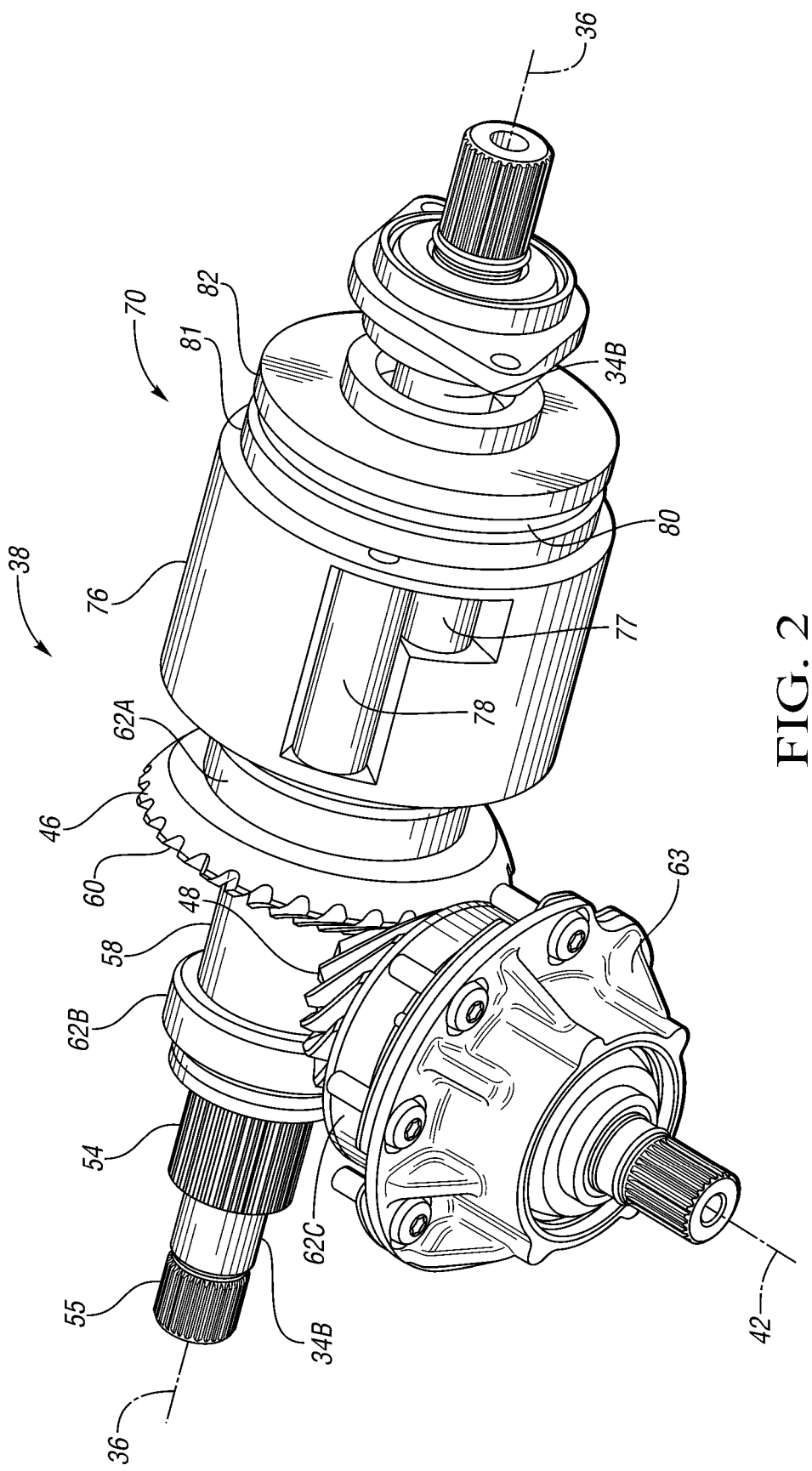
FIG. 2 is a schematic perspective illustration of a portion of the power transfer unit assembly of FIG. 1 surrounding the front half shaft.
Figure 3:
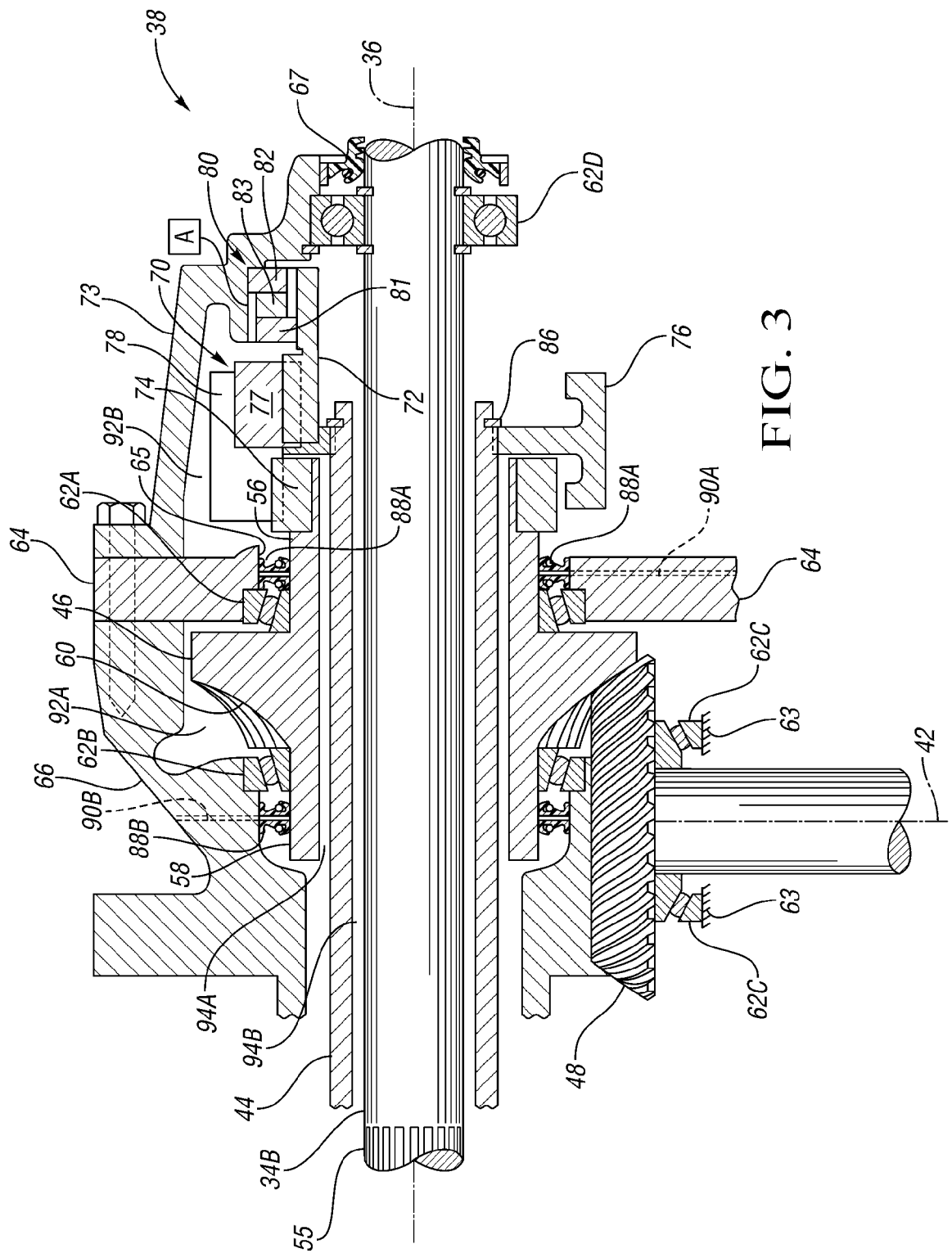
FIG. 3 is a schematic partially cross-sectional and fragmentary view of a portion of the power transfer unit assembly of FIG. 1 surrounding the front half shaft.

Referring to FIGS. 1-3, the first power transfer unit assembly 38 shows the input shaft 44 configured to be rotatably driven by the differential carrier 24 about the first axis of rotation 36. The input shaft 44 is connected to rotate in unison with the transmission differential carrier 24, as schematically depicted in FIG. 1. FIG. 2 shows a splined portion 54 of the input shaft 44 that is configured to fit to a splined opening of the differential carrier 24. The half shaft 34B extends through the input shaft 44. A splined portion 55 of the half shaft 34B is configured to be splined to the side gear 32B.

The hypoid ring gear 46 is annular and concentrically surrounds the input shaft 44. As best shown in FIG. 3, the hypoid ring gear 46 has a first annular shaft portion 56, a second annular shaft portion 58, and a tooth portion 60. The hypoid ring gear 46 is supported by only two annular bearings 62A, 62B. Bearing 62A supports the shaft portion 56 for rotation relative to a center support member 64 that is connected to a stationary housing 66 that surrounds and supports the hypoid ring gear 46 and the pinion gear 48. The support member 64 has an opening 65 through which the shaft portion 56, input member 44, and half shaft 34B extends. Bearing 62B supports the shaft portion 58 for rotation relative to the stationary housing 66. In FIG. 2, the housing 66 is removed.

The hypoid ring gear 46 is engaged with (i.e., meshes with) the pinion gear 48. In each of FIGS. 1-6, the pinion gear 48 meshes with the hypoid ring gear 46 in a different plane than the cross-section through the center of the hypoid ring gear 46. In other words, the pinion gear 48 is offset from the hypoid ring gear 46 so that the second axis of rotation 42 does not intersect the first axis of rotation 36. In FIGS. 1-6, the pinion gear 48 is above the cross-section shown. The pinion gear 48 drives the propeller shaft 40 about the second axis of rotation 42, and is connected to the propeller shaft 40 through a U-joint 68, shown in FIG. 1, or other appropriate connection. The ability to engage the pinion gear 48 at an offset with the hypoid ring gear 46 allows the position of the pinion gear 48, and thus the propeller shaft 40, to be higher or lower relative to the front half shafts 34A, 34B as required to accommodate a vehicle floor height, ground clearance, or other vehicle component such as a steering rack or cradle.

The power transfer unit assembly 38 includes a compound planetary gear set 70 arranged to be concentric with the first axis of rotation 36, and configured to transfer torque from the input shaft 44 to the hypoid ring gear 46 at a torque reduction ratio. The power transfer unit 38 has a first sun gear 72 operatively connectable to a stationary member, which is a cover 73. The cover 73 is bolted to the housing 66 with the support member 64 between the housing 66 and the cover 73 as shown in FIG. 3. Only a portion of the cover 73 above the first axis of rotation 36 is shown in FIG. 3. The cover 73 is removed in FIG. 2. A second sun gear 74 is fixed to the annular shaft portion 56 of the hypoid ring gear 46 to rotate in unison therewith. A carrier 76 is fixed to the input shaft 44 to rotate in unison therewith. The carrier 76 is a rotating web-like structure, and is configured to rotatably support a first set of pinion gears 77 and a second set of pinion gears 78 both secured to the carrier 76 with pins about which they rotate, as is understood by a person skilled in the art. The first set of pinion gears 77 meshes with the first sun gear 72. The second set of pinion gears 78 meshes with the first set of pinion gears 77 and with the second sun gear 74. The compound planetary gear set 70 has no ring gear or other members. In FIG. 3, the sets of pinion gears 77 and 78 are not shown in the lower portion of the view to reveal the carrier 76, and the carrier 76 is not shown in the upper portion to reveal the sets of pinion gears 77, 78. FIG. 2 shows that the carrier 76 actually concentrically surrounds the first axis of rotation 36. In FIGS. 1 and 3-6, only a portion of the housing 66 and the planetary gear set 70 and clutch 80 above the first axis of rotation 36 are shown. Only the second sun gear 74 and the carrier 76 are shown below the first axis of rotation 36. It should be appreciated that the housing 66 and planetary gear set 70 are symmetric about the first axis of rotation 36, and components are removed for purposes of clarity in the drawings.

The power transfer unit assembly 38 has a disconnect clutch 80 that selectively operatively connects the first sun gear 72 to the cover 73. When the disconnect clutch 80 is engaged, the first sun gear 72 is fixed to the cover 73 and thereby held stationary. With the first sun gear 72 stationary, the compound planetary gear set 70 is active, as it can transfer torque from the input shaft 44 to the hypoid ring gear 46 at a torque reduction ratio. That is, the torque at the hypoid ring gear 46 is less than the torque at the input shaft 44, while rotational speed is multiplied from the input shaft 44 to the hypoid ring gear 46.

Figure 4:
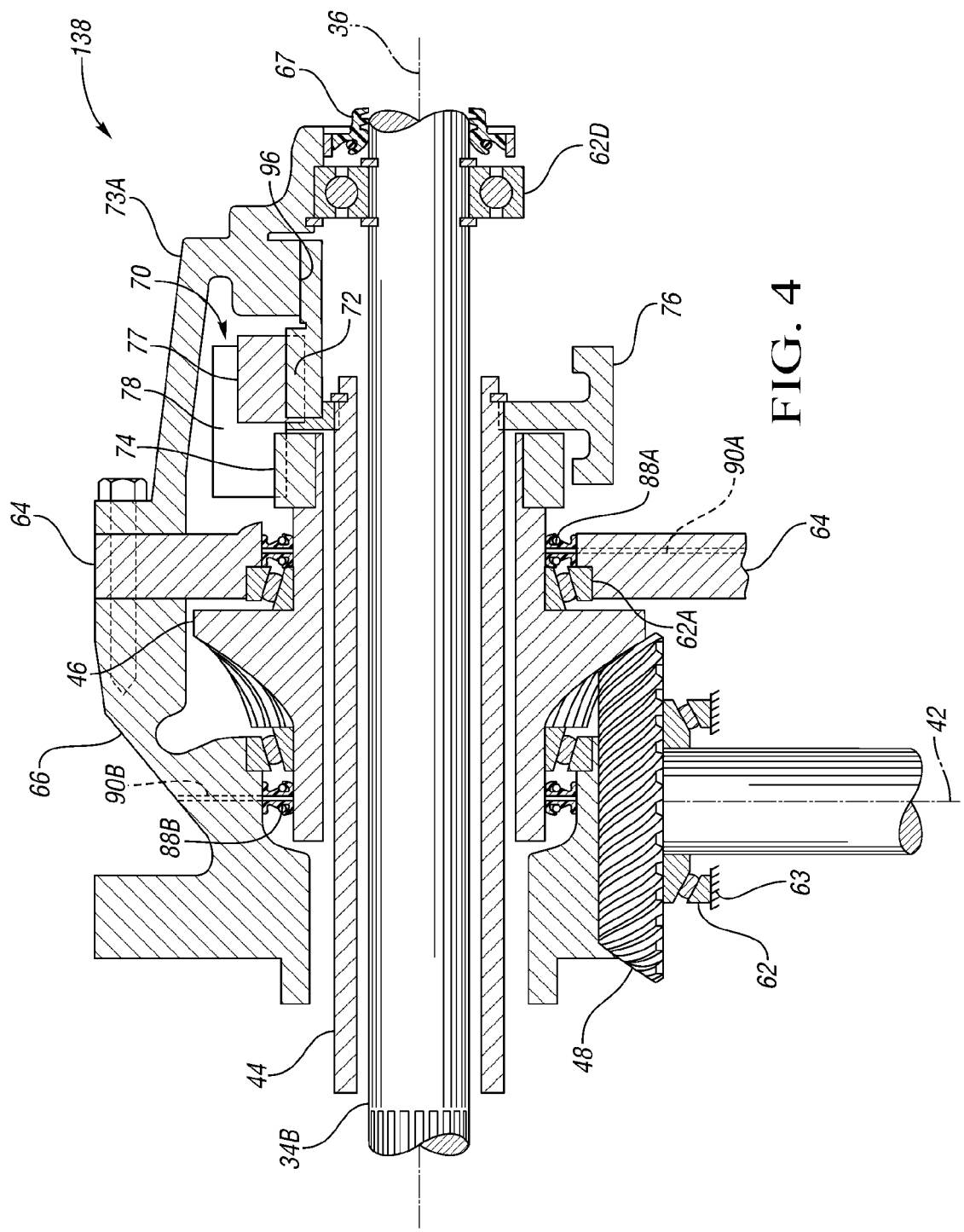
FIG. 4 is a schematic partially cross-sectional and fragmentary view of a portion of a second embodiment of a power transfer unit assembly surrounding the front half shaft for use in the powertrain of FIG. 1.
Figure 5:
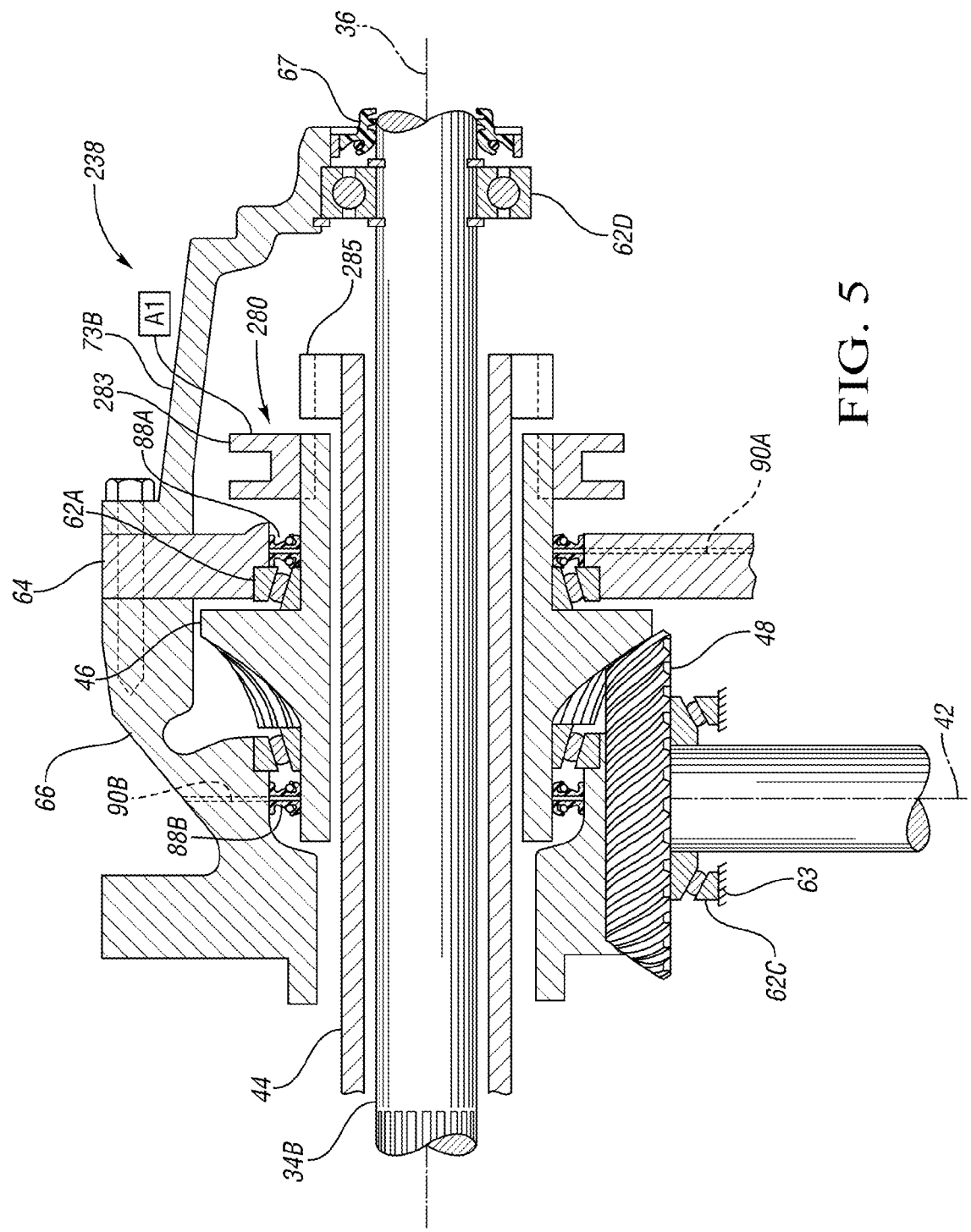
FIG. 5 is a schematic partially cross-sectional and fragmentary view of a portion of a third embodiment of a power transfer unit assembly surrounding the front half shaft for use in the powertrain of FIG. 1.
Figure 6:
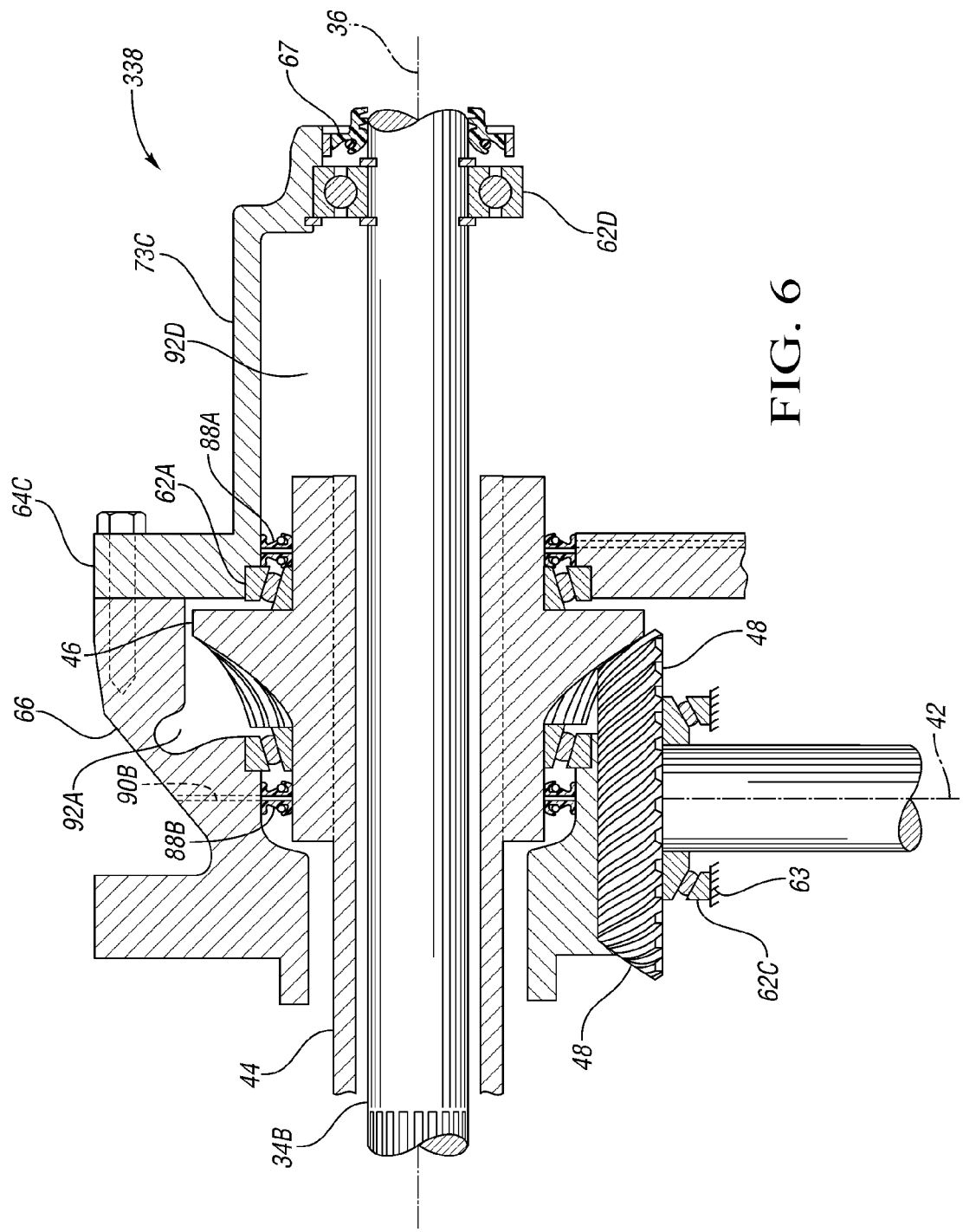
FIG. 6 is a schematic partially cross-sectional and fragmentary view of a portion of a fourth embodiment of a power transfer unit assembly surrounding the front half shaft for use in the powertrain of FIG. 1.

In the power transfer unit assemblies 38 or 138 of FIGS. 3 and 4 that have a compound planetary gear set 70, a higher torque can be applied to the input shaft 44 when the disconnect clutch 80 is engaged and the compound planetary gear set 70 is active, and yet a similar lower torque will result at the pinion gear 48 and attached propeller shaft 40 as when a lower torque is applied at the input shaft 44 in the power transfer unit assemblies 238 and 338 of FIGS. 5 and 6, in which only the reduction ratio of the hypoid ring gear 46 to the pinion gear 48 affects the torque at the propeller shaft 40. Additionally, the double pinion design results in the hypoid ring gear 46 rotating in the same direction as the input shaft 44. The direction of rotation of the pinion gear 48 and propeller shaft 40 is the same as in a lower ratio, low power transfer unit assembly such as 238 or 338. Moreover, the disconnect clutch 80 engages to connect a rotating component (the first sun gear 72) to a stationary component (the cover 73), which allows a simpler and less expensive clutch than would be required to connect two rotating components.

The power transfer unit assembly 38 provides an all-wheel drive mode in the vehicle 10 of FIG. 1 when the disconnect clutch 80 is engaged, and provides a front-wheel drive mode when the disconnect clutch 80 is disengaged, as the sun gear 72 will free-wheel and no torque will be transferred to the hypoid ring gear 46.

The disconnect clutch 80 can be any suitable type of selectively engageable clutch, such as a friction plate clutch, a band clutch, or a mechanical diode clutch, and can be electrically or hydraulically engaged by an actuator A under the control of a controller (not shown) that determines the operating conditions under which an all-wheel drive mode is established. To engage the disconnect clutch 80 such as to transition to an all-wheel drive mode, the propeller shaft 40 can first be brought up to a rotational speed that causes associated rotational speeds of the hypoid gear 46 and planetary gear set components. This will slow rotation of the sun gear 72 such as from a speed in the range of 700 to 900 revolutions per minute (rpm) to approximately 100 rpm, to enable near synchronous engagement of the sun gear 72 to the stationary cover 73 by the disconnect clutch 80. This can be accomplished if a clutch between the propeller shaft 40 and a rear differential can be engaged to rotate the propeller shaft 40.

In one embodiment, the disconnect clutch 80 has a rotating plate 81 secured to rotate with the first sun gear 72, a stationary plate 82 secured to the cover 73, and a selector plate 83 that is moved by the actuator A into contact with the rotating plate 81 to secure the rotating plate 81 to the stationary plate 82. This type of clutch may be referred to as a mechanical diode. The selector plate 83 can be designed to be engageable regardless of the direction of rotation of the rotating plate 81, in which case the clutch 80 is a two-way braking clutch, or can be designed as a one-way braking clutch that can be engaged only when the rotating plate 81 is rotating in a direction consistent with a forward gear, so that all-wheel drive capability is available only in forward motion.

Planetary spacing errors due to manufacturing tolerance stack-up can be relieved by configuring the first sun gear 72 to have some radial float or play relative to the first axis of rotation 36 by a splined interface with the plate 81 or with the cover 73A in the power transfer unit assembly 138 of FIG. 4 without a disconnect clutch. Additionally, the carrier 76 is constrained only by axial thrust bearings or washers 86 (one shown) to resist the axial load due to helical pinion gear lead angles. The carrier 76 has no radial bearings (i.e., the outermost radial surface of the carrier 76 is unconstrained), and so both the carrier 76 and the input shaft 44 are centered at a position dependent on a mesh of the first sun gear 72 with the first set of pinions 77 and the mesh of the second sun gear 74 with the second set of pinions 78, as the sets of pinions 77, 78 circumscribe the sun gears 72, 74. The second sun gear 74 can be attached to the annular shaft portion 56 of the hypoid ring gear 46 with involute or square splines and therefore can also self-center based on the mesh with the second set of pinion gears 78.

Only two sets of tapered or roller bearings 62A, 62B are required to center the hypoid ring gear 46 to rotate about the first axis of rotation 36. Another set of tapered or roller bearings 62C center the pinion gear 48 to rotate about the second axis of rotation 42. The roller bearings 62C are between the pinion gear 48 and a pinion gear cover 63 (shown in FIG. 2) that connects to the housing 66, which is removed in FIG. 2. Roller bearings 62D rotatably support the front half shaft 34B relative to the cover 73 and center the front half shaft 34B for rotation about the first axis of rotation 36. A lip seal 67 seals the half shaft 34B to the cover 73.

The center support 64 provides a location for an annular double lip seal 88A that seals between the shaft portion 56 of the hypoid ring gear 46 and the center support 64. Another annular double lip seal 88B seals between the shaft portion 58 of the hypoid ring gear 46 and the housing 66. A passage 90A is provided in the center support 64 in communication with the lip seal 88A. An end of the passage 90A can be at a location at the underside of the power transfer unit assembly 38 that is easily accessed for inspection. The passage 90A can be referred to as a weep hole, as it provides an indication of leakage past the lip seal 88A if fluid weeps through the passage 90A. A similar passage 90B is provided in the housing 66 in communication with the lip seal 88B to provide an indication of leakage past the lip seal 88B.

The housing 66 and the center support 64 define a first cavity 92A that contains the hypoid ring gear 46 and the pinion gear 48. The cover 73 and the center support 64 define a second cavity 92B containing the compound planetary gear set 70. The center support 64 and the lip seals 88A, 88B substantially isolate the first cavity 92A from the second cavity 92B. This enables the use of different fluids in the two cavities. For example, the first cavity 92A can be filled with hypoid gear lubrication fluid that has a relatively high viscosity. A lower viscosity fluid, such as automatic transmission fluid (ATF) can be provided from the transmission 16 and differential housing 28 to the second cavity 92B through an annular passage 94A between the hypoid ring gear 46 and the input shaft 44, and through an annular passage 94B between the input shaft 44 and the half shaft 34B. The carrier 76 can dip into any fluid that settles at the lower portion of the cavity 92B to disperse the fluid over the rotating components of the planetary gear set 70 both in front-wheel drive and all-wheel drive mode. By using lower viscosity transmission fluid in the second cavity 92B and isolating the higher viscosity gear lube in the first cavity 92A, spin losses are reduced. The lip seals 88A, 88B serve an additional function of increasing the drag on the rotating hypoid gear 46 to help keep it stationary about the first axis of rotation 36 when in a front-wheel drive mode. Lip seal 67 seals between the cover and the half shaft 34B, and is the only seal at which there is relative motion when the disconnect clutch 80 is disengaged. An alternative method to separate the two cavities 92A, 92B would be to place seals between the rotating hypoid ring gear 46 and input shaft 44, and between the input shaft 44 and half shaft 34B. In such an embodiment, the housing 66 would have an opening with a drain and fill plug to allow the cavity 92B to be filled with fluid.

FIG. 4 shows a power transfer unit assembly 138 alike in all aspects to the power transfer unit assembly 38 except that the instead of cover 73, a cover 73A is used that has a splined opening 96 that receives an outer spline of the first sun gear 72 to continuously ground the sun gear 72 to the cover 73A without a disconnect clutch. The power transfer unit 138 thus operates only in a torque reduction, all-wheel drive mode.

FIG. 5 shows a power transfer unit assembly 238 sharing many of the same components as the power transfer unit assemblies 38, 138 but without a torque reducing compound planetary gear set. Instead of cover 73 or 73A, a cover 73B is used that can potentially be smaller in size as it need not contain a compound planetary gear set. The power transfer unit 238 has disconnect capability, as a disconnect clutch 280 is provided. Thus, both front-wheel drive and all-wheel drive capability is available in a vehicle that has the power transfer unit assembly 238. The disconnect clutch 280 is a dog clutch with a sleeve 283 that is movable by an actuator A1 to slide axially on the shaft portion 56 to which it is splined to engage teeth 285 on an outer circumference of the input shaft 44. When the clutch 280 is disconnected (i.e., not engaged), the hypoid ring gear 46 is not driven by the input shaft 44, and remains stationary. The power transfer unit assembly 238 is a single axis power transfer unit able to share the same first and second axes of rotation 36, 42 and the same hypoid ring gear 46 and pinion gear 48 as the power transfer unit assemblies 38 and 138, but with the input member 44 only able to transfer torque to the propeller shaft 40 of FIG. 1 with a torque reduction ratio provided only by the hypoid ring gear 46 and pinion gear 48.

FIG. 6 shows a power transfer unit assembly 338 that shares many of the same components as the power transfer unit assemblies 38, 138, 238, but is a lower ratio unit that, like power transfer unit assembly 238 provides only the torque reduction of the hypoid ring gear 46 and pinion gear 48. The power transfer unit assembly 338 has the hypoid ring gear 46 fixed to the input shaft 44, with no disconnect capability. Thus, torque is always transferred to the propeller shaft 40 when the engine 14 is providing torque. The hypoid ring gear 46 can be either integral with the input shaft 44 or fastened by any number of means to the input shaft 44 including, but not limited to, welding, shrink fitting, splines, or a permanently installed sleeve. Additionally, a cover 73C integral with a center support member 64C is used. The cover 73C requires less radial packaging space than the cover 73 as there is no planetary gear set to be contained. The cavity 92D defined by the cover 73C may be smaller in size than cavity 92B.

Accordingly, the power transfer unit assemblies 38, 138, 238, and 338 are modular as each has a base of a housing 66, an input shaft 44, a hypoid ring gear 46 and a pinion gear 48. To meet the needs of different vehicle applications while maintaining a constant relative location of the first axis of rotation 36 and the second axis of rotation 42, either a direct torque unit or a torque reduction unit is added to the base components, either with or without disconnect capability by a disconnect clutch such as clutch 80 or 280. Using common components such as the hypoid ring gear 46 and pinion gear 48, and maintaining the components that accomplish the additional torque reduction concentric with a single axis (the first axis of rotation 36) may reduce weight, cost, and packaging space requirements in comparison to a two-axis torque reduction arrangement.

Because the compound planetary gear set 70 provides torque reduction at the input side of the bevel gear set (i.e., between the input shaft 44 and the hypoid ring gear 46), similar torque (but at increased speed) can be achieved at the propeller shaft 40 with a torque reduction unit (FIGS. 3 and 4) as with a direct torque unit (FIGS. 5 and 6). An application of the torque reduction unit (FIG. 3 or 4) with a relatively high power engine can ensure the same torque at the propeller shaft 40 as an application of the direct drive unit (FIG. 5 or 6) with a relatively low power engine. For example, if 2900 N-m torque is applied at the input shaft 44 of the power transfer unit 38 or 138, and the torque ratio (torque of the input member 44 to torque of the pinion shaft 48) is 2.9:1.0, the torque at the propeller shaft 40 will be 1000 N-m. If a lower powered engine is used, and 1700 N-m of torque is applied at the input shaft 44 of the power transfer unit 238 or 338, the torque ratio is 1.7:1.0 (torque of the input member 44 to torque of the pinion shaft 48 with no compound planetary gear set), then the torque at the propeller shaft 40 will also be 1000 N-m.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A power transfer unit assembly for transferring torque from a differential carrier of a front differential to a propeller shaft of a vehicle; wherein the differential carrier rotates about a first axis of rotation and the propeller shaft rotates about a second axis of rotation substantially perpendicular to the first axis of rotation, the power transfer unit assembly comprising:
   an input shaft configured to be rotatably driven by and rotatably fixed to the differential carrier to rotate at the same speed as the differential carrier about the first axis of rotation;
   a first bevel gear;
   a second bevel gear engaged with the first bevel gear; wherein the first bevel gear is annular and concentrically surrounds the input shaft; wherein the second bevel gear is configured to rotatably drive the propeller shaft about the second axis of rotation; and
   a compound planetary gear set concentric with the first axis of rotation and configured to transfer torque from the input shaft to the first bevel gear so that torque of the first bevel gear is less than torque of the input shaft and speed of the first bevel gear is greater than speed of the input shaft.

2. The power transfer assembly of claim 1, further comprising:
   a stationary member adjacent to the compound planetary gear set;
   a disconnect clutch selectively operatively connecting the compound planetary gear set to the stationary member to enable torque transfer from the input shaft to the first bevel gear through the compound planetary gear set; and
   wherein the disconnect clutch is selectively disengageable to disconnect the compound planetary gear set from the stationary member, thereby preventing torque transfer from the input shaft to the first bevel gear through the compound planetary gear set.

3. The power transfer assembly of claim 1, wherein the first bevel gear has an annular shaft portion concentrically surrounding the input shaft; and further comprising:
   a stationary member adjacent to the compound planetary gear set;
   wherein the compound planetary gear set includes:
      a first sun gear operatively connectable to the stationary member;
      a second sun gear fixed to the annular shaft portion of the first bevel gear to rotate in unison therewith;
      a carrier fixed to the input shaft to rotate in unison therewith;
      a first set of pinion gears and a second set of pinion gears both rotatably supported by the carrier; wherein the first set of pinion gears meshes with the first sun gear; and wherein the second set of pinion gears meshes with the first set of pinion gears and with the second sun gear.

4. The power transfer assembly of claim 3, further comprising:
   a disconnect clutch selectively operatively connecting the first sun gear to the stationary member to enable torque transfer from the input shaft to the first bevel gear through the compound planetary gear set; and
   wherein the disconnect clutch is selectively disengageable to disconnect the first sun gear from the stationary member, thereby preventing torque transfer from the input shaft to the first bevel gear through the compound planetary gear set.

5. The power transfer assembly of claim 3, wherein the first sun gear is splined to the stationary member.

6. The power transfer assembly of claim 3, wherein the carrier is configured to be centered at a position dependent on a mesh of the first sun gear with the stationary member and a mesh of the second sun gear with the annular shaft portion.

7. The power transfer assembly of claim 1, wherein the compound planetary gear set includes a carrier fixed to the input shaft for rotation in unison therewith; and wherein the carrier of the compound planetary gear set is axially constrained by a thrust bearing.

8. The power transfer assembly of claim 1, further comprising:
   a housing substantially surrounding the bevel gears;
   a cover attached to the housing and substantially surrounding the compound planetary gear set;
   a center support attached to the housing and the cover between the housing and the cover;
   a bearing between the center support and a shaft portion of the first bevel gear;
   a lip seal between the shaft portion of the first bevel gear and the center support;
   wherein the housing and the center support define a first cavity containing the first and the second bevel gears; wherein the cover and the center support define a second cavity containing the compound planetary gear set; wherein the center support and the lip seal substantially isolate the first cavity from the second cavity, thereby permitting a first fluid in the first cavity to be isolated from a second fluid in the second cavity.

9. The power transfer assembly of claim 8, wherein the center support has a passage extending through the center support and in communication with the lip seal.

10. The power transfer assembly of claim 1, wherein the first bevel gear has a first annular shaft portion and a second annular shaft portion, and further comprising:
   a housing substantially surrounding the bevel gears;
   a cover attached to the housing and substantially surrounding the compound planetary gear set;
   a center support attached to the housing and the cover between the housing and the cover; wherein the center support has a center opening through which the first annular shaft portion and the input shaft extend;
   a first bearing between the center support and the first annular shaft portion of the first bevel gear; and
   a second bearing between the housing and the second annular shaft portion of the first bevel gear.

11. A modular power transfer unit assembly for a vehicle; wherein the vehicle has a front differential with a differential carrier defining a first axis of rotation and a propeller shaft defining a second axis of rotation substantially perpendicular to the first axis of rotation, the modular power transfer unit assembly comprising:
   an input shaft configured to be rotatably driven by the differential carrier about the first axis of rotation when the modular power transfer unit assembly is installed on the vehicle;
   a bevel gear set including a first bevel gear and a second bevel gear; wherein the first bevel gear is annular and concentrically surrounds the input shaft; wherein the second bevel gear is engaged with the first bevel gear and is rotatably driven by the first bevel gear to rotate about the second axis of rotation; wherein the second bevel gear is configured to rotatably drive the propeller shaft when the modular power transfer unit assembly is installed on the vehicle;

a stationary housing surrounding and supporting the first and second bevel gears and adapted to be alternately connectable to either selected one of:
- a torque reduction unit concentric with the first axis of rotation and configured to transfer torque at a reduction ratio from the input shaft to the first bevel gear; and
- a direct torque unit concentric with the first axis of rotation and configured to transfer torque at a unitary ratio from the input shaft to the first bevel gear;

wherein the propeller shaft rotates in the same direction in response to a forward rotation of the input shaft in an all-wheel drive mode when either the torque reduction unit or the direct torque unit is installed on the vehicle;

wherein the torque reduction unit has:
- a compound planetary gear set concentric with the first axis of rotation; and
- a stationary cover attached to the stationary housing and substantially surrounding the compound planetary gear set;

wherein the compound planetary gear set has:
- a first sun gear selectively operatively connectable to the stationary cover;
- a second sun gear fixed to the first bevel gear to rotate in unison therewith;
- a carrier fixed to the input shaft to rotate in unison therewith;
- a first set of pinion gears and a second set of pinion gears both rotatably supported by the carrier; wherein the first set of pinion gears meshes with the first sun gear; and wherein the second set of pinion gears meshes with the first set of pinion gears and with the second sun gear; and
- a disconnect clutch selectively engageable to fix the first sun gear member to the stationary cover thereby permitting torque transfer from the input shaft to the first bevel gear through the compound planetary gear set, and selectively disengageable to disconnect the first sun gear member from the stationary cover thereby preventing torque transfer from the input shaft to the first bevel gear through the compound planetary gear set.

12. A power transfer unit assembly for transferring torque from a differential carrier of a front differential to a propeller shaft of a vehicle; wherein the differential carrier rotates about a first axis of rotation and the propeller shaft rotates about a second axis of rotation substantially perpendicular to the first axis of rotation, the power transfer unit assembly comprising:
- an input shaft configured to be rotatably driven by the differential carrier about the first axis of rotation;
- a hypoid ring gear engaged with a spiral pinion gear; wherein the hypoid ring gear is annular, concentrically surrounds the input shaft, and has a first and a second annular shaft portion; wherein the spiral pinion gear is configured to rotatably drive the propeller shaft about the second axis of rotation;
- a compound planetary gear set concentric with the first axis of rotation and configured to transfer torque from the input shaft to the hypoid ring gear at a reduction ratio;
- a stationary member adjacent to the compound planetary gear set;

wherein the compound planetary gear set includes:
- a first sun gear operatively connectable to the stationary member;
- a second sun gear fixed to the annular shaft portion of the hypoid ring gear to rotate in unison therewith;
- a carrier fixed to the input shaft to rotate in unison therewith;
- a first set of pinion gears and a second set of pinion gears both rotatably supported by the carrier; wherein the first set of pinion gears meshes with the first sun gear; and wherein the second set of pinion gears meshes with the first set of pinion gears and with the second sun gear;

a disconnect clutch selectively operatively connecting the first sun gear to the stationary member to enable torque transfer from the input shaft to the hypoid ring gear through the compound planetary gear set;

wherein the disconnect clutch is selectively disengageable to disconnect the first sun gear from the stationary member, thereby preventing torque transfer from the input shaft to the hypoid ring gear through the compound planetary gear set;

a housing substantially surrounding the bevel gears;

a cover attached to the housing and substantially surrounding the compound planetary gear set;

a center support attached to the housing and the cover between the housing and the cover; wherein the center support has a center opening through which the first annular shaft portion and the input shaft extend;

a first bearing between the center support and the first annular shaft portion of the hypoid ring gear; and a second bearing between the housing and the second annular shaft portion of the hypoid ring gear.

* * * * *